Inventor
RODNEY JACKSON
By Cook & Robinson
Attorney

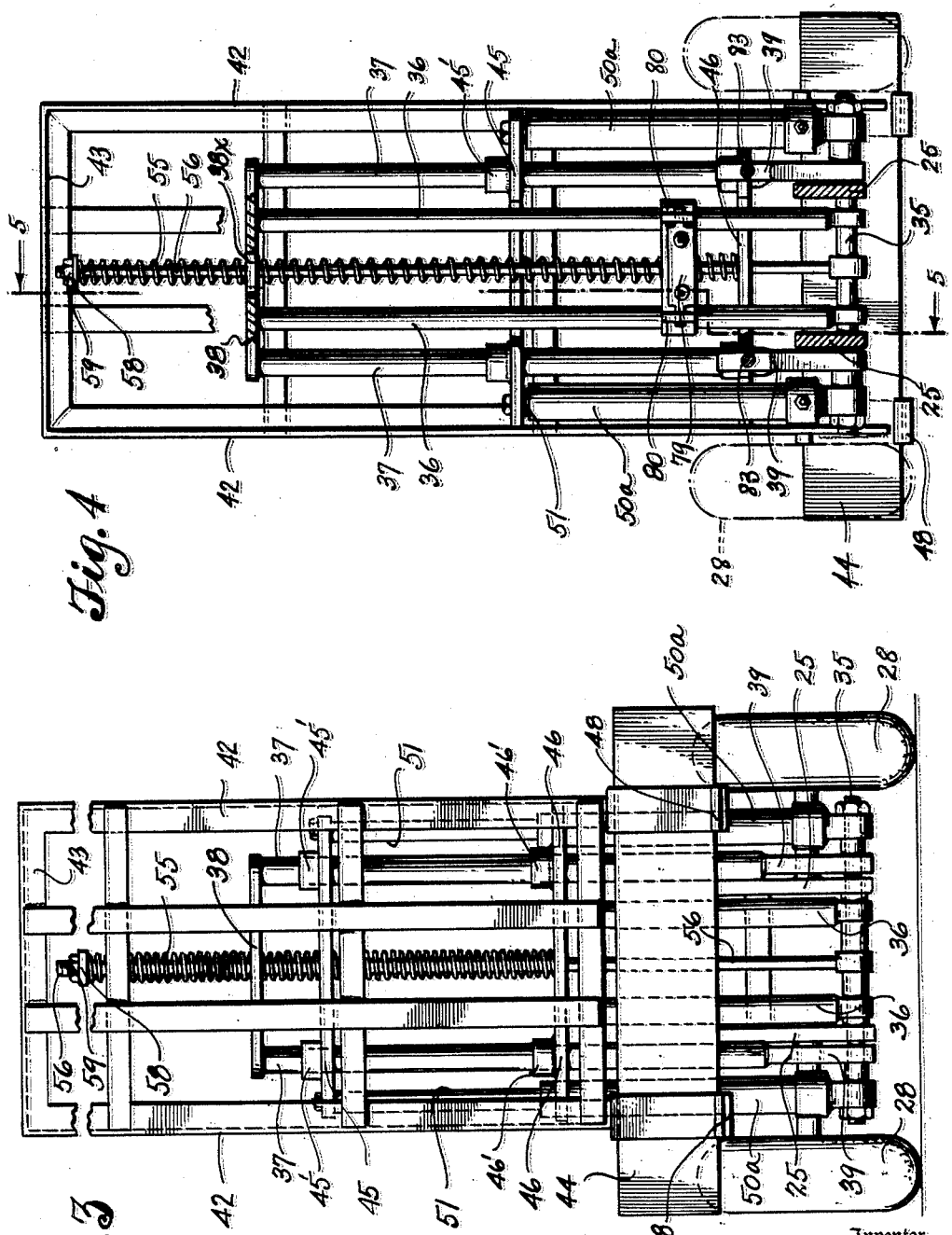

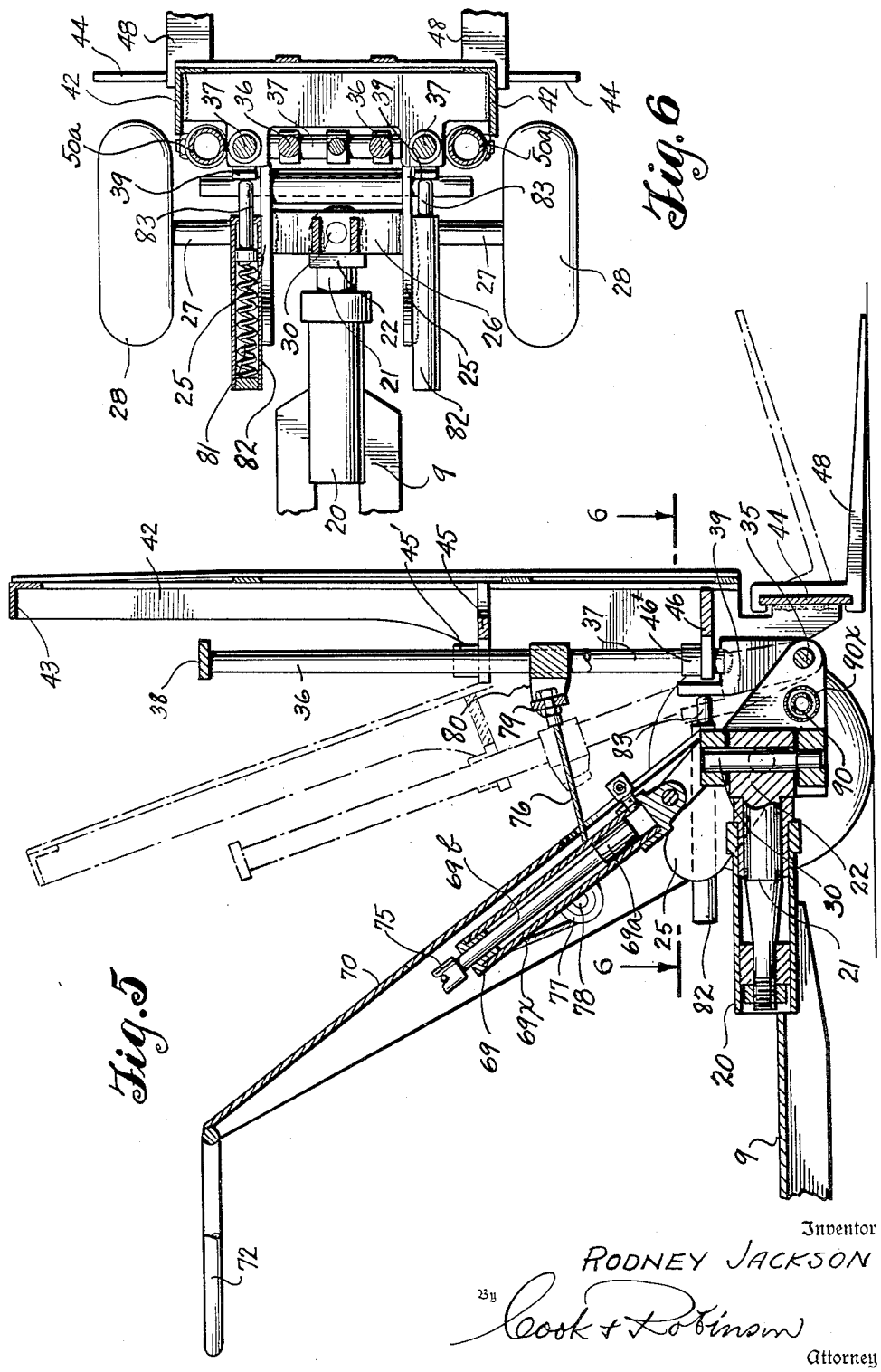

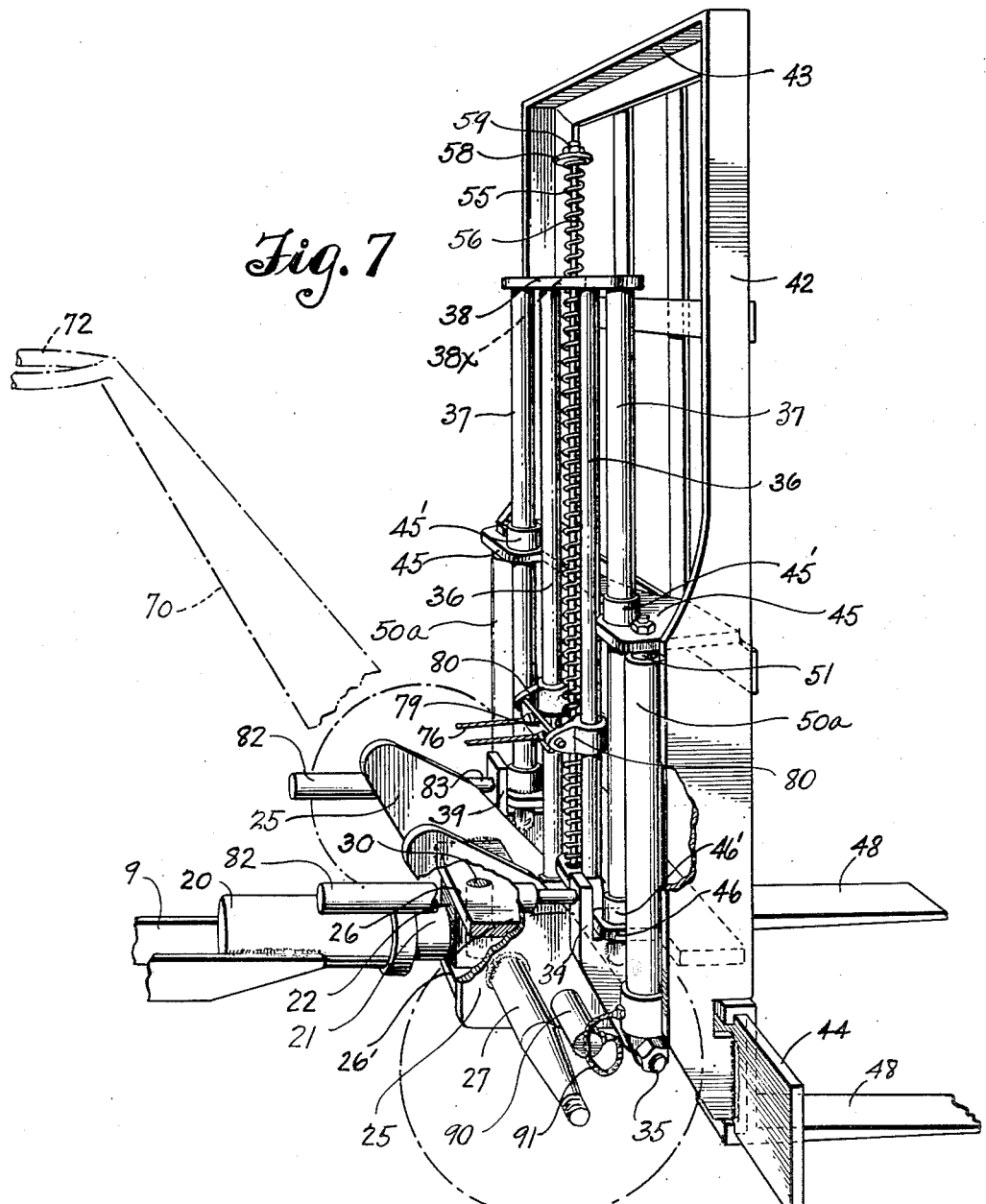

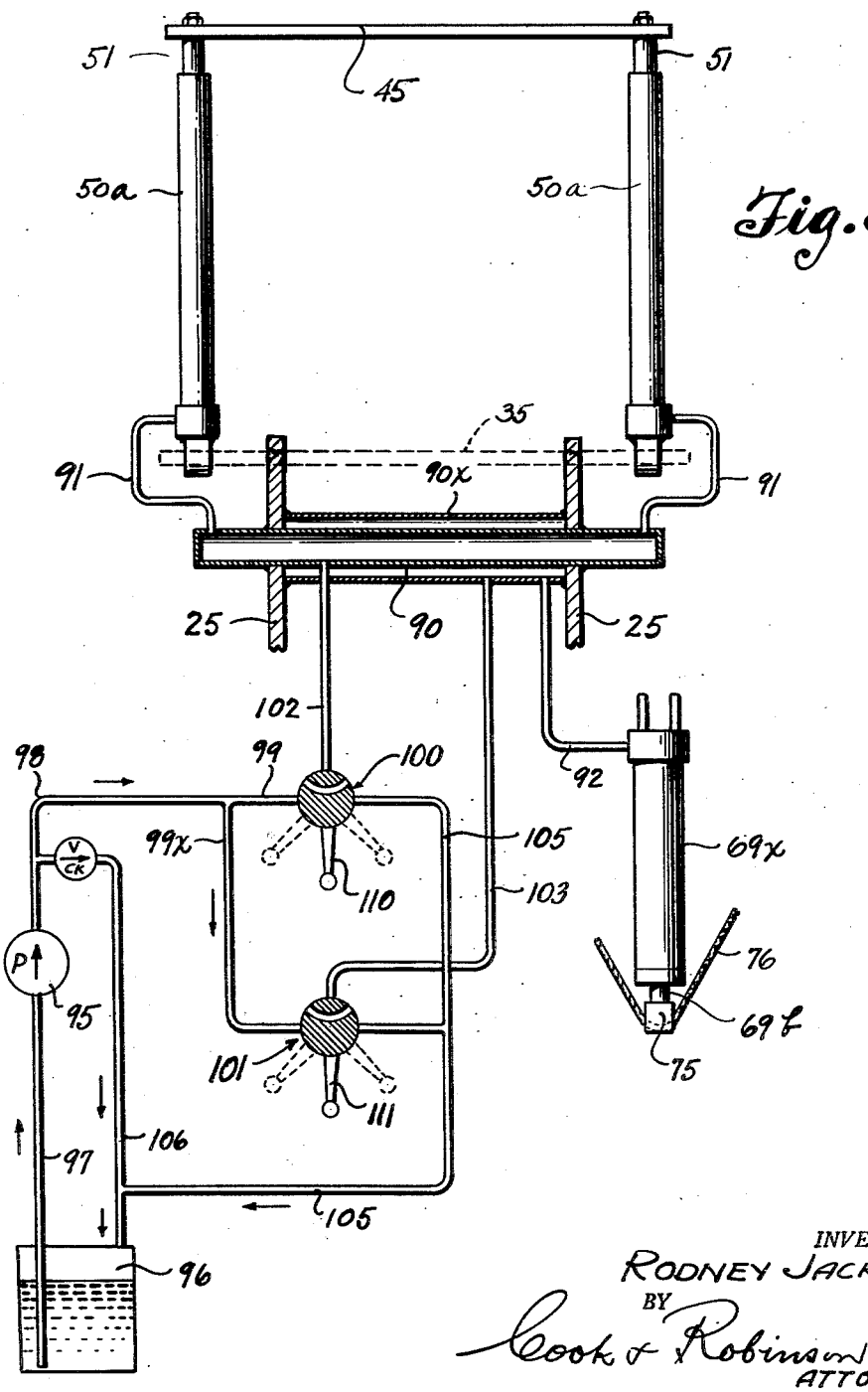

Patented June 29, 1954

2,682,349

UNITED STATES PATENT OFFICE 2,682,349

MOTORIZED HAND TRUCK

Rodney Jackson, Seattle, Wash., assignor to
Paul J. Isaacson and F. T. Isaacson

Application July 27, 1951, Serial No. 238,893

5 Claims. (Cl. 214—674)

This invention relates to industrial hand trucks, and it has reference more particularly to improvements in motorized hand trucks of those kinds designed for use in factories, warehouses, stores, and various other places where hand trucks for the moving of heavy articles and objects of various kinds are desirable and generally used; the present invention being in the nature of an improvement in trucks of the kind of character of those typified by the disclosures in U. S. Patents #2,377,389; #2,430,625 and #2,468,316.

It is the principal object of this invention to provide an automotive hand truck that is especially designed for the moving of barrels, stacked boxes or cases and other items of various kinds and character, and which comprises a chassis having articulated, wheel mounted front and rear sections; the rear section being the powered and operator supporting portion, and the front section being the steering portion and also mounting the load carrying means directly thereon.

It is a further object of the invention to provide the steerable portion of the truck with a load carrier frame that is both tiltable and liftable by hydraulic means mounted on the front section under easy and ready control of the operator while standing on the powered rear section of the chassis.

More specifically stated, the objects and advantages of the present invention reside in the details of construction of the means for mounting the load carrying frame; in the hydraulic means for effecting the tilting of the frame and for holding it in a tilted position; in the hydraulic means for raising and lowering the load holding rack along its mounting frame, and in the devices whereby these various operations are controlled by the operator.

It is also an object of the invention to provide improvements in trucks of the kind typified by the patents above listed in that the hydraulic means provided to tilt the mounting frame and that provided to raise and lower the load carrier rack thereon are independent of the means for direction control and steering.

Still further objects of the invention reside in the details of construction and combination of parts, and in their mode of operation as will hereinafter be fully described.

In accomplishing the above mentioned and other objects of the invention, I have provided the improved details of construction, the preferred forms of which are illustrated in the accompanying drawings, wherein—

Fig. 3 is a front end elevation of the truck, showing the load carrier rack in an elevated position; parts that are rearward of the rack and rack mounting frame being omitted to avoid confusion in the illustration.

Fig. 4 is a vertical cross-section of the truck, taken substantially on the line 4—4 in Fig. 1.

Fig. 5 is a sectional view, in the vertical plane of line 5—5 in Fig. 4, showing the means for moving the mounting frame for the load carrier rack from upright to a rearwardly inclined position.

Fig. 6 is a horizontal section taken substantially on line 6—6 in Fig. 5.

Fig. 7 is a perspective view of the frame structure of the front end section, the load carrier rack and its mounting frame.

Fig. 8 is a diagrammatic illustration of the hydraulic system and controls associated therewith.

Figure 1:
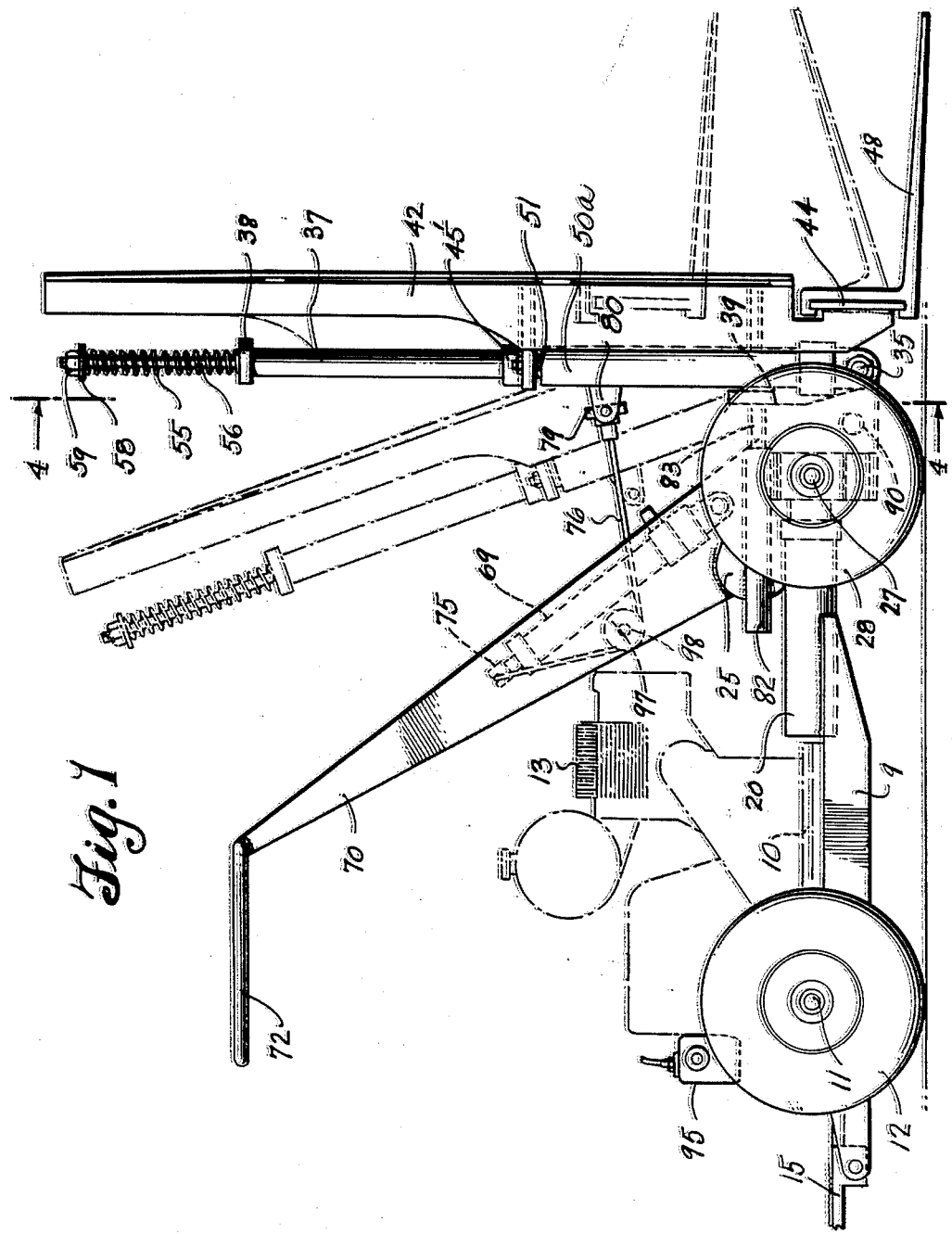
Fig. 1 is a side view of an industrial truck embodying the improvements of the present invention therein, showing the load carrier rack in loading position; the engine and its controls being indicated generally in dotted lines.

Referring more in detail to the drawings—

The present truck has a wheel equipped chassis comprising articulated front end and rear end sections; these sections being pivotally joined to provide for steering the vehicle through the mediacy of the front end section under control of an operator while he is standing or riding on the rear end section. The rear section comprises a rigid frame 9 and platform 10, supported by a cross-axle 11, which at its ends, is equipped with ground wheels 12—12. Mounted on the platform is an engine 13 and this is operatively connected, for forward and reverse driving of the vehicle, through the mediacy of the axle 11 and wheels 12. The engine also is the power source for the operation of a pump used in connection with the hydraulic system by which the load carrier rack is raised and also tilted.

Since the engine and power transmission means used in the present truck, as well as the various devices used to control the operation of the engine, form no novel part of the present application, they will not be described in detail. It is to be understood that they may be of any suitable kind and anticipate driving the axle through a clutch mechanism which may be released or set for forward or rearward driving by adjustment of a foot pedal designated in Fig. 1 at 15; this being disclosed in a co-pending application.

Rigidly fixed to and extended forwardly from the frame structure 9 of the rear section, in the central longitudinal plane of the vehicle, is a tubular bearing 20 in which a connecting shaft 21 for the two sections is coaxially contained and rotatably fixed as has been illustrated in Fig. 5. The forward end portion of this shaft 21 extends from the bearing 20 and is equipped with a head 22 through which the pivotal connection for steering is made with the front end section of the chassis, as presently will be explained.

The front end section of the chassis comprises a frame structure which is best shown in Fig. 7 to comprise parallel, vertically disposed opposite side plates 25—25, rigidly joined in laterally spaced relationship by vertically spaced horizontal cross-bars 26 and 26'. Mounted on this frame, at opposite sides thereof and in axial alignment, are stub axles 27—27 on which ground wheels 28 and 28 are mounted; these wheels being aligned with the rear, driving wheels 12—12. The head block 22, which is fixed to the forward end of the previously mentioned connecting shaft 21, is located between and is pivotally secured to the bars 26—26' by a vertical pivot pin 30 extended through these parts. The connection thus provided between the front and rear sections by the shaft 21 and pin 30 provides the desired articulation of the sections and permits the steering of the vehicle.

The laterally spaced opposite side plates 25—25 of the frame structure of the front section, as shown in Fig. 7, extend forwardly of the axial line of wheels 28—28. Extended through and rigidly supported by these plates, at their forward ends, is a horizontal cross-shaft 35 on which the mounting frame for the load carrier rack is supported. Referring particularly to Figs. 3 and 4, it will be observed that the rack mounting frame comprises paired vertically directed rods, 36—36, that are equally spaced at opposite sides of the central longitudinal plane of the machine and two paired guide shafts 37—37 that are also located at opposite sides of and equally spaced from the central longitudinal plane of the vehicle and at the outside of the rods 36—36. The rods 36—36 and shafts 37—37, are all welded, or otherwise rigidly secured, at their upper ends to a flat cross bar 38. At their lower ends, the rods 36—36 are pivoted directly on the cross shaft 35, but the guide shafts 37—37 have extension plates 39—39 welded to their lower ends as seen in Fig. 5 and these are pivoted at their lower ends on the cross-shaft 35.

Thus the rack mounting frame structure, comprised by the parallel shafts 36—36, 37—37 and the upper end connecting bar 38, is supported for tilting adjustment between the upright position in which it is shown in Figs. 1 and 5, and the rearwardly inclined position, as therein indicated in dotted lines.

The load carrying rack, mounted by this frame as shown best in Figs 1 and 3, comprises the upright, parallel opposite side beams 42—42, that are rigidly joined across their upper ends by a cross-bar 43 and at their lower ends are welded or otherwise rigidly secured to a flat, vertically disposed cross-plate 44. Welded to and extended horizontally between the side beams 42—42 in vertically spaced relationship, at a medial location and near their lower ends respectively, are plates 45 and 46. The guide shafts 37—37 of the rack mounting frame, extend through guide bearings 45' and 46' formed on these plates. Thus the load carrier rack is vertically movable on the guide shafts 37—37, between a lowered position for loading, in which it is shown in full lines in Fig. 1, and a raised position in which it is indicated in dotted lines. Load pick up bars 48 are applied to the opposite end portions of the plate 44, and are adapted for lateral adjustment therealong to different spacings. These bars are adapted to engage flatly on a floor at their outer ends for loading, and are raised with the rack for carrying the load.

For the elevating of the load carrier rack, I have provided hydraulic jacks, 50—50, located respectively, at opposite sides of the frame, as well shown in Figs. 1 and 4. Each jack comprises a vertically disposed hydraulic cylinder 50a that is pivotally mounted at its lower end on the corresponding end portion of the cross shaft 35 as carried by the frame plates 25—25, and a piston rod 51 that extends upwardly therefrom and is engaged against and secured to the corresponding end portion of the cross-bar 45. Thus, as presently explained, the application of a hydraulic pressure medium to the lower ends of the jack cylinders causes the extension of the piston rods, and lifts the rack accordingly. The downward movement of the raised rack, permitted by an outflow of the pressure medium from the lower ends of the jack cylinders, is expedited by the force of a coil spring 55 that is held under compression on a vertical guide rod 56 that is pivotally attached at its lower end to the cross shaft 35 and extends upwardly therefrom, through recessed portions of the cross bars 45 and 46, and a hole 38x in cross bar 38. The spring 55 rests at its lower end on the plate or bar 46 and at its upper end bears against a washer 58 held by a nut 59 that is threaded onto the upper end of the rod 56.

Figure 2:
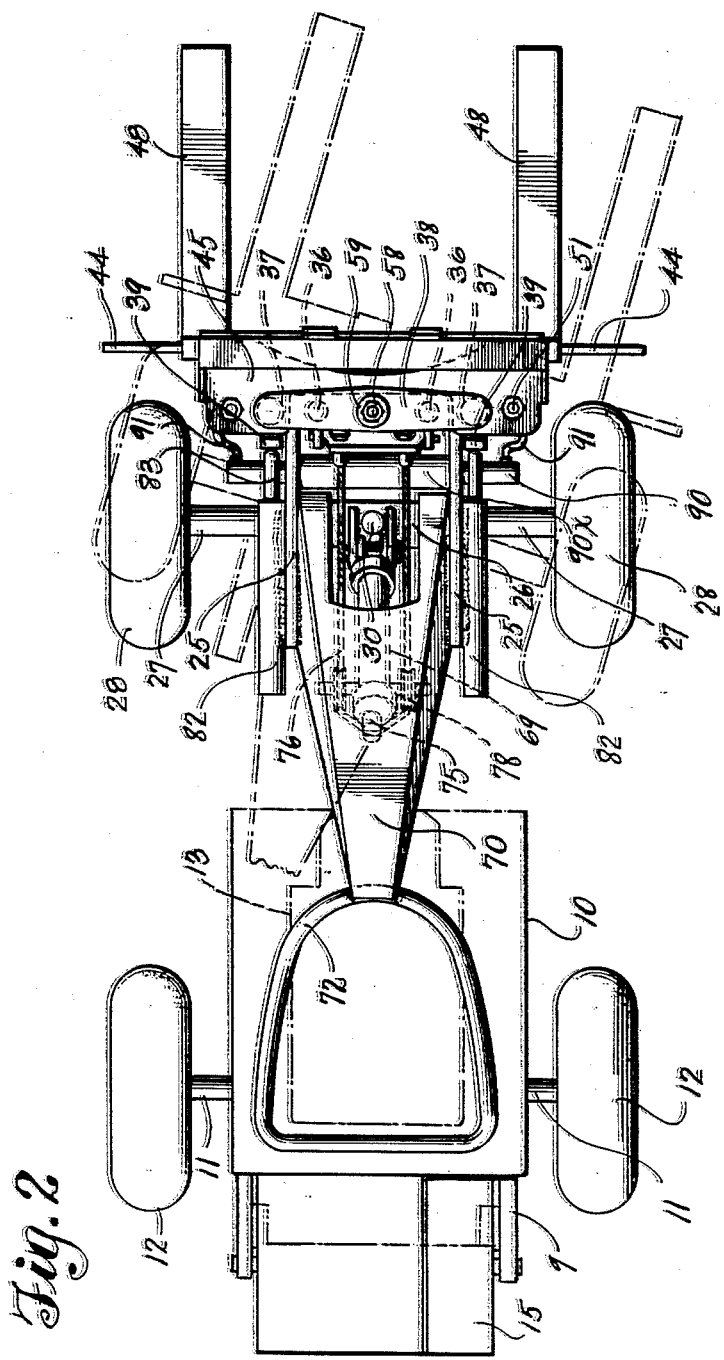
Fig. 2 is a top, or plan view of the same, indicating the turning action of the front section of the chassis in one direction.

To tilt the rack mounting frame and load carrier rack from an upright position to a rearwardly inclined position, at which a load thereon can be substantially balanced over the axle of the front wheels, I have provided a hydraulic jack 69 that is located in a steering post 70 provided for manually controlling the steering of the front section of the chassis. This steering post, is rigidly secured at its lower end to the steerable front frame section of the chassis to plates 25—25 as seen in Figs. 1 and 2 and is upwardly and rearwardly directed. It comprises an inverted, channel shaped beam that is of substantial width at its lower end, and tapers to small dimensions at its upper end and is there equipped with a horizontally disposed handle portion 72 in the form of an open ring which is easily accessible to the operator when standing on the platform of the rear section of the chassis.

The hydraulic jack 69 comprises a cylinder 69x that is rigidly fixed to and located within the steering post 70 in the position and manner as noted in Fig. 5. Contained, in the cylinder, is a piston 69a from which a piston rod 69b extends. At its upper end, the rod 69b is equipped with a shoe 75 in form of a sheave segment. A cable 76 is passed over this segment 75 and its opposite end portions are extended downwardly along opposite sides of the cylinder, thence under sheaves 77—77 mounted on a cross-shaft 78 that is fixed in the post, thence forwardly and are secured at their ends to a cross bar 79 that is extended transversely between and pivotally fixed at its ends, in bearings 80—80 that are mounted on the vertical rods 36—36. Thus when a hydraulic pressure medium is admitted to the lower end of the jack cylinder 69x, the piston rod will be extended upwardly, and the mounting frame for the load carrying rack will be tilted rearwardly by pull of the cable 76 in accordance with the extent of movement of the piston rod.

The rearward tilting of the rack mounting and load carrying rack is yieldingly resisted by springs 81 contained in guide tubes 82 that are welded horizontally to the opposite side plates 25—25 of the front end frame structure as well shown in Figs. 2 and 7. These springs seat against plugs that are threaded into the rear ends of the tubes, and at their forward ends engage against push rods 83 that are slidably contained in the forward end portions of the tubes, as in Fig. 6, and extend therefrom into contact with the upper end portions of the plates 39—39 to which the lower ends of the guide shafts are welded. The springs 80 are at all times under sufficient compression as to urge the rack mounting frame forwardly as the hydraulic medium is released from the lower ends of the jack cylinders.

Hydraulic pressure medium is supplied to the cylinders 50a—50a of the two frame lifting jacks from a tubular distributing manifold 90 that is supported by and which is extended horizontally between and through the side plates 25—25 of the front end frame structure as seen in Fig. 7, and also diagrammatically shown in Fig. 8. Sections of flexible hose 91—91 connect opposite ends of the tube 90 with the lower ends of the hydraulic cylinders 50a—50a. There is also a short tubular manifold 90x, here shown to be applied about tube 90 but might be parallel thereto and not surrounding it, that has a flexible hose connection 92 leading therefrom to the lower end of the jack cylinder 69x. Manifolds 90 and 90x are separate one from the other as well understood by reference to Fig. 8.

Mounted on the platform of the rear section of the vehicle is a hydraulic pump 95. This is operable in any suitable way to forcibly deliver hydraulic medium into the manifolds from a supply tank designated at 96 in Fig. 8 wherein the hydraulic system is diagrammatically shown. In the diagram, the intake side of the pump 95 is shown to be connected to tank 96 by a pipe 97, and leading from the discharge side is a pipe 98, with connections 99 and 99x therefrom to control valves 100 and 101.

The valves 100 and 101 have connections 102 and 103, respectively, leading to the manifold 90 and 90x. Also, each valve has a return connection 105 with the supply tank 96. Also, the pipe line 98 has a return line 106 to tank 96 in which a pressure relief valve 108 is interposed.

The valves 100 and 101 are individually manually controlled by means of hand levers, here indicated at 110 and 111, to cause delivery of pressure medium to the corresponding manifolds, 90 and 90x, or to close the valves, or to allow return flow of pressure medium from the hydraulic jack cylinders to the tank 96.

To lift the load carrying frame, the valve 100 is manually adjusted to connect pipe line 99 with line 102 and thus admit pressure medium to manifold 90 and the two lifting jacks. To hold the frame at a set position of adjustment, the valve is then closed, or set at a neutral position. To lower the frame the valve is adjusted to connect line 102 with return line 105 and allow the pressure medium to return to tank 96.

Likewise, to tilt the frame from its upright position to a rearwardly inclined position, the valve 101 is manually adjusted to delivery pressure medium from lines 98 and 99x to manifold 90x through pipe 103 then to jack cylinder 69x through pipe 92. To hold the frame at any inclined position, the valve 101 is set at a neutral or closed position. To permit return of the frame to its upright position, the valve 101 is adjusted to connect line 103 with line 105. The springs 81 push the frame back from its inclined position as the hydraulic medium flows back to tank 96.

The present arrangement of parts provides for the easy, ready and fast adjustment of the load carrying frame from lowered to raised position, or from upright to rearwardly inclined position. All control devices pertaining thereto are easily accessible to the operator standing on the platform. In this truck the load carried may be substantially balanced on the front axle.

The provision, as herein made, for the elevating of the load from near ground level is primarily to prevent interference in operating trucks of this character in places where ramps may be rather abruptly inclined from horizontal surfaces. It gives ample clearance for speedy and safe operation up and down inclined roadways and also has advantages where the elevating of a load is desirable for other reasons.

Having thus described my invention, what I claim as new therein and desire to secure by Letters Patent, is:

1. A truck of the character described having an articulated chassis, including a wheel mounted and power propelled rear end section, and a forward steerable section comprising a frame structure with transversely aligned supporting and steering wheels and an upwardly and rearwardly inclined steering column fixed thereto; a horizontal shaft extended transversely through the frame of the said forward section, forwardly of the steering wheels, an upright frame structure hingedly mounted at its lower end on said cross-shaft for movement from a substantially upright loading position to a rearwardly inclined load carrying position, a load carrying rack mounted on the said upright frame structure at the forward side thereof for movement upwardly and downwardly therealong, forwardly directed load pick-up supports at the lower end of said rack, a jack comprising a vertically disposed hydraulic cylinder pivoted on the said cross-shaft and having its piston rod extended upwardly from the cylinder and connected with the rack, another jack comprising a hydraulic cylinder mounted on the steering column and movable therewith, and a piston rod extended from the cylinder and means operatively connecting it with the tiltable guide frame for pulling it back to an inclined position, and means for controlling the application of hydraulic pressure medium to the jacks and its release therefrom.

2. In a truck of the character described having an articulated chassis including a front end section with frame structure comprising laterally spaced, vertical side plates, axles extending outwardly from the plates, supporting and steering wheels mounted on the axles, and a steering column rigidly fixed to the frame, a horizontal cross-shaft extended through the side plates forwardly of the wheels, a frame structure hingedly mounted at its lower end on the cross-shaft, for movement between a substantially upright position and a rearwardly inclined position, a load carrier rack mounted on the frame structure forwardly thereof for lifting and lowering movement thereon, a pair of hydraulic cylinders pivoted at their lower ends on opposite ends of the cross-shaft, pistons in the cylinders with rods extending from the upper ends of the cylinders and fixed to the rack for its actuation, a hydraulic cylinder mounted in the steering column, a piston rod extended therefrom, cable connection between piston rod and hinged frame structure whereby the latter can be pulled to an inclined position, spring means resisting the tilting of the frame, and spring means acting downwardly against the rack to return it to lowered position and means for controlling the application to and release of pressure medium from the jack cylinders.

3. A truck as recited in claim 2 wherein manifolds are mounted in the frame structure of the steerable section with flexible conduit connections with the said jack cylinders, and said means provided for controlled application of the pressure medium includes separate control valves for admittance of the pressure medium to and from the manifolds.

4. An industrial truck of the character described comprising an articulated chassis with steerable wheel supported front section, with a rearwardly and upwardly inclined steering column rigidly fixed thereto and movable therewith and a powered rear section, a frame structure hingedly supported at its lower end on the said front section at the forward end of the truck, for limited forward and rearward tilting, a load holding rack mounted on the frame structure at the front side thereof for vertical movement thereon and having forwardly directed load pick-up and supporting means at its lower end, means on the said steerable section for raising and lowering the rack along said frame structure from a position with the load pick up means engaged against the ground surface to an elevated load moving position, and means on said steerable section for maintaining a yieldable forward acting force against the frame structure, and a manually controlled power operated means in the steering column for applying a positive force against the frame structure to tilt it on its hinged mounting to a rearwardly inclined position.

5. A truck as recited in claim 4 wherein the said yieldable forwardly acting force comprises springs that are confined under compression in guide tubes that are fixed to the steerable front section, and which springs bearing against the inner ends of push rods that are fitted slidably in the tubes and extend forwardly therefrom into contact with said hinged frame structure at a distance above the hinge axis.

References Cited in the file of this patent
UNITED STATES PATENTS

| Number | Name | Date |
|---|---|---|
| 1,538,168 | Cochran | May 19, 1925 |
| 1,827,209 | Robbins | Oct. 13, 1931 |
| 1,952,730 | Remde | Mar. 27, 1934 |
| 2,110,424 | Quayle | Mar. 18, 1938 |
| 2,220,450 | Howell | Nov. 5, 1940 |
| 2,284,237 | Stevenson | May 26, 1942 |
| 2,287,469 | Cochran | June 23, 1942 |
| 2,377,389 | Waters | June 5, 1945 |
| 2,514,563 | Todd | July 11, 1950 |
| 2,516,074 | Remde | July 18, 1950 |
| 2,589,102 | Le Tourneau | Mar. 11, 1952 |
| 2,618,396 | Belt | Nov. 18, 1952 |